P. C. DANIELS.
LEATHER STAKING MACHINE.
APPLICATION FILED FEB. 9, 1912.
1,055,717.
Patented Mar. 11, 1913.
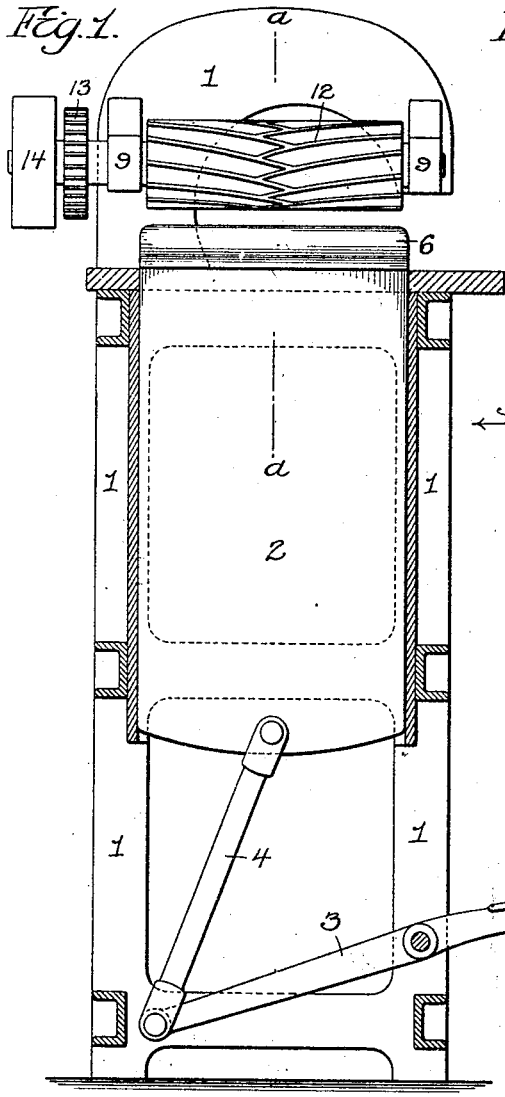
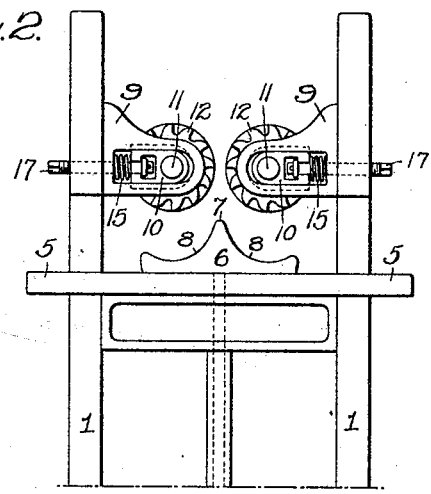
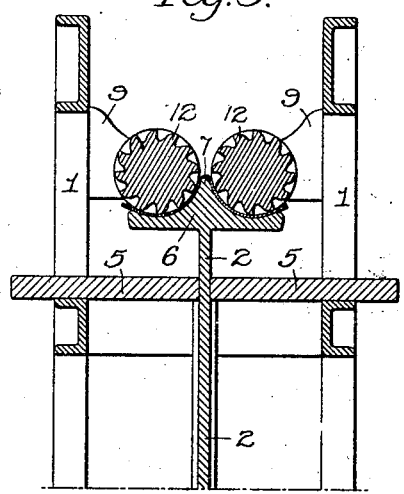
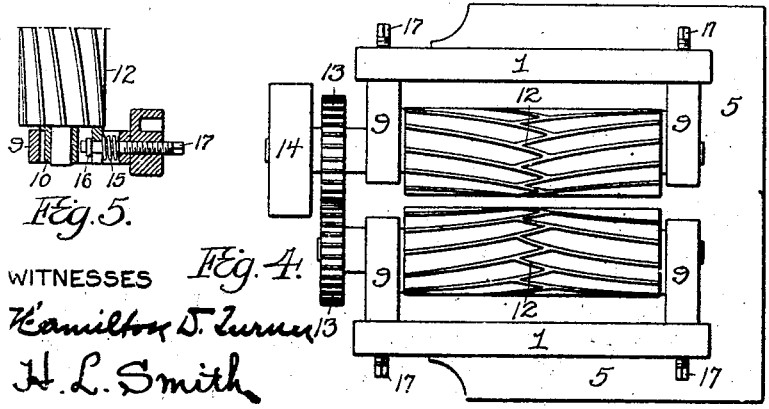
WITNESSES
Hamilton T. Turney
H. L. Smith
INVENTOR
PARVIS C. DANIELS
BY HIS ATTORNEY
Harry Smith

UNITED STATES PATENT OFFICE.

PARVIS C. DANIELS, OF PHILADELPHIA, PENNSYLVANIA, ASSIGNOR TO BURK BROTHERS, OF PHILADELPHIA, PENNSYLVANIA, A CORPORATION OF PENNSYLVANIA.

LEATHER-STAKING MACHINE.

1,055,717.      Specification of Letters Patent.      Patented Mar. 11, 1913.

Application filed February 9, 1912. Serial No. 676,614.

*To all whom it may concern:*

Be it known that I, PARVIS C. DANIELS, a citizen of the United States, residing in Philadelphia, Pennsylvania, have invented certain Improvements in Leather-Staking Machines, of which the following is a specification.

The object of my invention is to provide a machine for quickly and effectively subjecting a hide or skin to a softening and stretching operation technically known as "staking", an object which I attain in the manner hereinafter set forth, reference being had to the accompanying drawing, in which—

Figure 1 is a longitudinal sectional view of a staking machine constructed in accordance with my invention; Fig. 2 is a front view of the upper portion of the same looking in the direction of the arrow $x$ Fig. 1; Fig. 3 is a transverse section of part of the machine on the line $a$—$a$, Fig. 1; Fig. 4 is a plan or top view of the machine; and Fig. 5 is a horizontal section of one of the roller bearings.

The fixed frame 1 of the machine has guides for a vertically movable slide 2 to which movement can be imparted by means of a treadle lever 3 connected to the slide by a rod 4, said slide passing through a table 5 on the fixed frame and carrying, at its upper end, a head 6 with central projecting bar 7 and concave recesses 8 on each side of the same. Brackets 9 mounted upon the upper portion of the fixed frame provide guides for laterally movable boxes 10 constituting the bearings for a pair of shafts 11, each of which carries a roller 12 with ribbed face, the ribs on one side of the longitudinal center of the roller being disposed at a reverse angle to those on the opposite side of the same, and said ribs overlapping at the central portion of the roller, as shown in Figs. 1 and 4. The shafts 11 are geared together at one end by intermeshing spur wheels 13 and one of the shafts carries a pulley 14 to which power may be imparted by means of a suitable belt from the adjacent upper shaft. The bearing boxes 10 for the shafts 11 are projected inwardly by means of springs 15, the limit of inward projection being determined by means of a collar 16 on an adjusting screw 17 adapted to a threaded bearing in one of the side frames of the machine, so that while the rollers 12 are free to yield outwardly to pressure between them the limit of their approach can be regulated by adjustment of the screw 17.

The skin to be acted upon is laid upon the head 6 when the latter occupies the lowered position shown in Figs. 1 and 2, the central portion of the skin resting upon the projecting bar 7 of the head and the opposite sides of the skin occupying the concave recesses 8 in the head. The head is then raised by lifting the slide 2 so as to bring the skin into contact with the ribbed rollers 12 which have, by preference, been so adjusted that when the skin comes into contact with the same they will be slightly separated and therefore, under the influence of the springs 15, will be pressed yieldingly against the outer surface of the skin and will pull upon the same in opposite directions with the result that a skin will be softened and stretched both laterally and longitudinally, the rotation of the ribbed rollers serving to impart the lateral stretch to the skin and the reverse angle of the ribs on the rollers serving to stretch the same longitudinally from the center toward each end. The fact that the rollers are prevented from approaching each other beyond the predetermined limit prevents them from bearing with undue pressure upon the skin and thus precludes the tearing of the skin or other injury thereto, which might arise from such undue pressure. To further aid in preventing injury to the skin by undue pressure thereon the head 6 may also have a coating of felt or other cushioning material for the support of the skin. If it is desired to operate upon the central portion of the skin which normally rests upon the central bar 7 of the table 6, the latter, after the completion of the operation before described, may be lowered and the skin shifted slightly in lateral position in one direction or the other, and the head 6 then raised so as to bring said central portion of the skin under the action of one or other of the rollers 12. The head 6 is employed in acting upon the neck and shank portions of the skin which are relatively narrow or it may be employed in acting upon full skins when the same are narrow enough to have all their portions brought into contact with the rollers 12 when the skin is laid upon the head, as shown in the drawing, or the diameter and length of the rollers and the size of the head 6 may be increased to accommodate skins of any size.

Although for the purpose of facilitating the operation it is preferable to rotate both of the rollers simultaneously they may, if desired, be rotated alternately, one roller being stationary and holding the skin on one side of the head 6 or slide 2 while the other roller rotates and acts upon the skin, and the operation being then reversed, the roller which formerly rotated being stationary and that which was formerly stationary being rotated.

I claim:

The combination, in a leather staking machine, of a pair of ribbed rollers, means for rotating one of said rollers in one direction and the other in the opposite direction, with a skin-supporting device having a head with concave portions, one of which extends part way around one of the rollers and the other part way around the other roller, and means for moving said skin-supporting head from and toward the rollers.

In testimony whereof, I have signed my name to this specification, in the presence of two subscribing witnesses.

PARVIS C. DANIELS.

Witnesses:
KATE A. BEADLE,
HAMILTON D. TURNER.